(12) United States Patent
Kohns

(10) Patent No.: US 6,947,635 B2
(45) Date of Patent: Sep. 20, 2005

(54) DEVICE AND METHOD FOR TRANSMITTING LIGHT OVER AN OPTICAL FIBER

(75) Inventor: Peter Kohns, Bonn (DE)

(73) Assignee: Instrument Systems GmbH, Munich (DE)

( * ) Notice: Subject to any disclaimer, the term of this patent is extended or adjusted under 35 U.S.C. 154(b) by 220 days.

(21) Appl. No.: 10/258,962

(22) PCT Filed: May 4, 2001

(86) PCT No.: PCT/EP01/05037

§ 371 (c)(1),
(2), (4) Date: Jun. 13, 2003

(87) PCT Pub. No.: WO01/86334

PCT Pub. Date: Nov. 15, 2001

(65) Prior Publication Data

US 2004/0042718 A1 Mar. 4, 2004

(30) Foreign Application Priority Data

May 5, 2000 (DE) .......................... 100 21 940

(51) Int. Cl.⁷ ................................................ G02B 6/14
(52) U.S. Cl. .......................................... 385/32; 385/28
(58) Field of Search .............................. 385/27–29, 32

(56) References Cited

U.S. PATENT DOCUMENTS 4,669,467 A    6/1987  Willett et al.
4,877,305 A  * 10/1989  Ricciardelli ................. 385/123
5,408,551 A  *  4/1995  Maria van Woesik ........ 385/28
6,122,425 A  *  9/2000  Krill .......................... 385/100
6,130,970 A  * 10/2000  Hong et al. .................... 385/28
6,532,244 B1 *  3/2003  Dewey et al. ......... 372/29.014

FOREIGN PATENT DOCUMENTS

DE      39 39 999 C2    4/1990
FR         80 06084     9/1981

* cited by examiner

*Primary Examiner*—Akm Enayet Ullah
*Assistant Examiner*—Jerry T Rahll
(74) *Attorney, Agent, or Firm*—Blakely, Sokoloff, Taylor & Zafman; Stephen M. De Klerk

(57) ABSTRACT

The invention relates to a method and device for transmitting light over a fat fiber (1) between optical components (B1; B2) of an optical measuring device, which are provided at a launching end (C) and at an extraction end (R; K; O) of the fat fiber (1). Said measuring device comprises a guiding means for the curved rigid guidance of a first partial section (PQ; FGHI; IJ; FL; LM; MN) of the fat fiber (1). If the radius of curvature of the curved guidance falls below a first limit, the light beam profile of the fat fiber (1) is homogenized by a mode mixing. In order to diminish the effect on the transmitted light caused by a permitted change in position of the fat fiber (1), a stiffening means, which is rigidly connected to the guiding means, is provided for rigidly guiding a second partial section (QR; JK; NO) of the fat fiber (1). Said second partial section connects to the first partial section (PQ; FGH; IJ; FL; LM; MN) and extends essentially up to the optical component (B2) located at the extraction end (R; K; O), whereby the entire length of the first and second partial section is at least provided with a length that renders the extraction end (R; K; O) of the fat fiber (1) mechanically stable.

24 Claims, 2 Drawing Sheets

DEVICE AND METHOD FOR TRANSMITTING LIGHT OVER AN OPTICAL FIBER

CROSS-REFERENCE TO OTHER APPLICATIONS

This Application is a National Phase of International Application No. PCT/EP01 /05037, filed on May 4, 2001, which claims priority from German Patent Application No. 100 21 940.3, filed on May 5, 2000.

BACKGROUND TO THE INVENTION

The invention relates to a device and a method for transmitting light fiber in accordance with the pre-characterizing clauses of claims 1, 20 and 25.

SUMMARY OF THE INVENTION

One exemplary configuration relates to the measurement of photometric or radiometric values, in which the light is transmitted between the input optic (first optical component) and a suitable measuring instrument (second optical component) via a glass fiber (waveguide or optical fiber). Glass fiber transmission has the advantage that both optical components (in this case the input optic and the measuring instrument) may be located at a distance from one another, particularly if one of the two optical components (in this case the measuring instrument) is physically bulky whereas the other optical component (in this case the input optic) is realized as a compact unit. This locational separation has a further advantage in cases where measurements are to be taken with spatial offsetting (if the input optic is to be moved). In addition, locational separation may be particularly advantageous in industrial uses since it is thus possible to shield the often very sensitive measuring instrument from the process to be measured.

It should be noted locational separation of the two optical components also means that the light collected by the first optical component may be guided towards the other optical component (measuring instrument) as a free beam. However, this has the fundamental disadvantage that sophisticated optical mirrors must be used to guide the beam due to the linear scatter of the free beam. Moreover, additional difficulties arise, for example, if the input optic has to be moved, perhaps to provide a grid scan of a display surface that is to be measured in position offset luminance studies.

Accordingly, transmitting the light beam through glass fibers represents a practical solution. To protect the glass fibers from the unforgiving environmental conditions in industrial installations, they are usually installed unsecured in impact-resistant protective conduits. The essential advantage of using glass fibers lies in their (usually limited due to the material properties of the glass fiber material used) flexibility. This assures simple transmission of the measurement beam from, for example, a movable input optic to a fixed measuring instrument.

However, transmission of the light between two optical components by means of a glass fiber suffers from a serious drawback in that both the transmission of the light through the glass fiber and the spatial and angular distribution of the light at the source depend on the position (or course) of the glass fiber. This means, for example, that any calibration of the overall system is accurate only until the glass fiber is moved. In the display measurement described above, for example, changes of up to 20% are observed in the measured luminance value when the glass fiber is moved, even though the display has a homogenous (constant) luminance distribution. It may be seen, therefore, that the use of glass fibers particularly for transmitting a measured light signal from a mobile optical component to a fixed optical component causes significant disturbance to the measured light signal.

In order to mitigate the undesirable effect of this change in transmission due to changes in the position of the glass fiber, it has been suggested to pass the light through a fiber bundle consisting of many (several hundred) individual glass fibers rather than a single glass fiber, so that the changes in transmission of the individual fibers, and accordingly the transmission change of the fiber bundle will be reduced when the entire bundle is moved (while at the same time the flexible light transmission between input optic and optical measuring instrument is advantageously preserved). The disadvantage of this solution (besides the considerably higher cost of providing the fiber bundle) lies in the significantly reduced total transmission in the fiber bundle as compared with a single fiber having the same diameter, since a smaller proportion of fiber bundle cross-section is involved in actually transporting the light. This increases the length of time required for measurement, to a level that is unacceptable in many measurement applications where the objective is a specific signal to noise ratio.

Methods for multimode fibers having very small diameter (less than 100 micrometers) have been described and are known as "microbending". According to such methods, a locally varying transverse pressure is exerted along the length of the fiber, so that the course of the fiber displays radii of curvature less than one centimeter for a given segment of the fiber. The transverse pressure is usually applied by rigid structures that may be pressed against the fiber with adjustable pressure by means of a locking screw.

It has also been proposed to pass the fiber through a receptacle containing shot for a certain length, thereby exerting a locally distributed transverse force on the fiber. Most suggestions for solving the problem are directed in telecommunication technology at superimposing the modes that form at the fiber output end during transmission of a single pulse such that the modes are emitted not as temporally separate pulses (which might then be detected as different pulses) but instead merge to form one single, temporally extended pulse. It should be noted here that in telecommunication technology low-pass effects that are caused by "wobbling" ("wobbling" lasts no more than a few milliseconds) of the waveguide are insignificant in the giga-Hertz range, since these low-pass effects are filtered out subsequently anyway.

The use of "thick-core fibers" as fiber optics is also known, for example, from the field of optical measurement, in attempts to transmit a sufficient amount of light between the two optical components (particularly an input optic and an optical measurement instrument) in comparison with, for example, the single mode fibers used in telecommunication technology. It should be noted here that one drawback of the thick core fibers is that they are less flexible due to their greater diameter.

From the species-related U.S. Pat. No. 5,408,551 and French Patent No. FR 247 8828, it is known that the curved rigid course of a waveguide (called a glass fiber rod in the American document, a glass fiber in the French document) provokes mode mixing, which causes homogenization of the beam profile if the degree of curvature is controlled accordingly.

A catheter is known from U.S. Pat. No. 4,669,467 in which a fiber bundle extends inside the catheter from a laser beam input optic to the distal end of the catheter in order to remove for example plaques in congested arteries with the aid of the laser beam that is guided by the fiber bundle. A mode mixer is provided at the laser beam input optic, which mixes the modes by the method of "microbending" described above so as to produce the largest possible beam spot for the beam emerging at the output of each individual fiber at the distal end of the fiber bundle.

In practice, however, despite the advantages of this application of mode mixing, transmission changes associated with changes in the position of the fiber optics continue to be observed.

The task of the present invention is, in conventional light transmission means using an optical fiber between two optical components of an optical measurement device, to further reduce the effect on the transmitted light (particularly on the measurement value) that is caused by a reasonable change in position of the waveguide fiber.

This task is solved by the invention with each of the objects disclosed in claims 1, 20 and 25. Preferred embodiments of the invention are described in the subordinate claims.

In a species-related device according to the above, the waveguide fiber is a thick core fiber. Moreover, a reinforcing means is provided that is rigidly attached to the guide means for rigid guidance of a second subsegment of the thick core fiber, and that is connected to the first subsegment and essentially extends as far as the optical component at the output side, the lengths of the first and second subsegments being at least such that the output end of the thick core fiber is mechanically stabilized. In a species-related method, the light is transmitted through a thick core fiber. Also, the light is passed from the first subsegment essentially to the output end of the thick core fiber through a second rigidly guided subsegment of the thick core fiber, the total length of the first and second subsegments being at least such that the output end of the thick core fiber is mechanically stabilized.

The advantage of the invention consists in that changes in the fiber transmission due to changes in position of the thick core fiber may be effectively suppressed in a relatively compact construction of the device as follows: Usually, when the light is coupled in an optical fiber, not all transmission modes are excited. This means that the beam profile is non-homogenous at the output end of the optical fiber, and may also be further altered if the optical fiber is moved. In particular, however, a non-homogenous beam profile leads to measurement errors in such optical measuring devices, which by virtue of their function must attenuate a portion of the beam profile (e.g. a grid spectrometer with its specific input aperture). To alleviate this situation, the mode mixer (the curved rigid subsegment) has been added, the curvature of which falls below a first threshold value. Of course, this threshold value for fiber curvature is determined by the material used, the diameter and length of the thick core fiber, the overall configuration of the optical apparatus (particularly the input coupling of the light beam in the thick core fiber) and the required degree of mode mixing/homogenization.

However, since the homogenization of the light bundle may be measured easily, the threshold value may also be determined experimentally with reference to the parameters indicated (i.e., the actual measurement construction), and the curved guide may be shaped accordingly.

Regarding this threshold value for the purposes of the use according to the invention of thick core fibers as optical fibers, the following should also be noted: in much of the literature containing notes on the use of thick core fibers, it is recommended that the minimum radius of curvature must not be less than 300× the diameter of the fiber. This means, for example, that a thick core fiber having a diameter of 600 micrometers must have a radius of curvature of at least 18 cm, which is not adequate for mode mixing (see below). However, it has been determined that considerably smaller radii of curvature can be achieved with these thick core fibers. The limits recommended by the manufacturers appear to have their origin in the fact that most such thick core fibers are produced for transmitting high luminous power for materials processing. With small radii of curvature, a portion of the light escapes from the fiber, a further portion is converted to cladding modes (see below). The result of both is that the fiber is destroyed at high luminous powers due to high light absorption. However, luminous power transmitted in measurement equipment is lower, with the result that the fibers cannot be destroyed, even with radii of curvature of as small as those indicated.

It should be noted further that for the most extensive mode mixing (i.e., excitation of practically all transverse modes) the emergence angle of the light from the thick core fibers also assumes the constant value for the digital aperture, and the effect on the emergence angle of changing the position of the thick core fibers is at most negligible.

This is desirable for the stability of the measurement signal and in applications involving a spectrometer.

The angle of emergence and the intensity distribution of the light exiting thick core fibers can also be measured easily, for example by directing the exiting light against a surface arranged perpendicularly to the thick core fiber and examining the shape of the beam spot projected thereonto. In this way, for example, the first threshold value can be determined by testing the angle of curvature for which the size of the projected beam spot is greatest. This does not necessarily mean that all modes are also excited. However, in this case it may be assumed that the light beam profile is extensively homogenized.

It has been further recognized that imprecise coupling with the thick core fiber of the light for transmission, which is virtually impossible to preclude in practice, causes "cladding modes" that are in the cladding not in the core, to become excited. Depending on the position of the thick core fiber, these cladding modes are suppressed to various degrees, which means that the overall fiber transmission is dependent on the position of the thick core fiber. The change in the fiber transmission is affected to a critical extent by the non-uniform suppression of the cladding modes, with the result that suppression of the cladding modes may advantageously counteract the change in fiber transmission resulting from a change in position of the fiber. In all cases, these cladding modes are also stripped away entirely at points of curvature (in the mode mixer) of the thick core fiber, and the angle of curvature necessary for stripping is usually smaller than the angle of curvature required for mode mixing (first threshold value). In this context, however, it has further been recognized that new cladding modes are excited at these curved points of the thick core fiber, since some light beams from the fiber core are incident on the cladding at a steeper angle, and thus exceed the angle for total internal reflection at the core/cladding interface. These newly excited cladding modes then continue to be transmitted along the thick core fiber. If the remaining length of the thick core fiber from the mode mixer to the output end is still flexibly arranged, changes in the position of the fiber in this region may cause inconsistent suppression of the cladding modes newly generated in the mode mixer, and thereby also an undesirable change in transmission. The invention has served to mitigate this effect in that it provides for the remaining segment of the thick core fiber from the mode mixer to the output end to be arranged rigidly in a reinforcing means. At the same time, the entire rigid guidance for the thick core fiber in the guidance means and reinforcing means is at least long enough to ensure that position changes of the thick core fiber upstream of the mode mixer do not cause position changes in the fiber after the mode mixer. For example, if the thick core fiber extends for such a length in the guidance means alone that position changes of the fiber at the output end are precluded, the length of the reinforcing means may be reduced to zero if the mode mixer is thus arranged directly at the output end (see also independent claim 25). In addition, if the thick core fiber is sufficiently rigid, a short fiber end may also protrude from the reinforcing means without a surrounding guide as far as the output end, if it is possible to guarantee that, because of the rigidity of the fiber, positional changes of this fiber end cannot occur, or will be so minor that the associated changes in fiber transmission can be compensated.

The overall length of the first and second subsegments may be easily determined experimentally by determining the minimum length at which significant movement of the thick core fiber prior to the mode mixer does not lead to any change in position of the thick core fiber at the output end.

With reference to the guidance means, it should be further noted that the guided length of the curved subsegment should preferably exceed a specified value. This value too may easily be determined experimentally by testing for the minimum length at which the desired effects occur. However, it has been demonstrated that for an appropriate curvature the critical parameter is the angle of curvature, and the length of the rigid curved guidance means is of lesser importance.

A connecting means is preferably provided at the interface between the thick core fiber and the optical component at the input and/or output end for detachable connection of the thick core fibers with the respective optical component. In this way, various optical components may be advantageously connected together via the thick core fiber using a simple plug-in system. Thus, for example, various input optics as required by the process to be tested may be connected to the same optical measurement device. In this case, the guidance means may be coupled rigidly and directly with the connection means—without the additional reinforcing means—provided the connecting means and guidance means together are long enough to ensure that the output end of the thick core fiber is secured in a sufficiently stable manner (see above).

An additional reinforcing means is preferably provided for rigid guidance of a third subsegment of the thick core fiber, which extends as far as the optical component at the input end, the length of the third subsegment being at least long enough to ensure that the input end of the thick core fiber is stabilized. In such case, it has further been demonstrated that particularly a movement (e.g. canting) of the face surface of the thick core fiber relative to the respective optical component provokes significant effects on the (measurement) light signal being transmitted. This problem arises particularly when standard commercial plug-in connections are used (e.g. SMA plugs) which by their principle only secure the thick core fiber at individual points. Such plugs normally have a plug length of one centimeter only, so that the thick core fibers (which have a diameter of up to a millimeter) are therefore only secured at certain points inside the plug. Because of the large diameter of the fiber and the associated large forces that act when the thick core fiber is moved, this arrangement of securing the thick core fiber at points only allows angular movement of the frontal face of the fiber, even if the movement of the fiber takes place as much as 10 centimeters distant from the connecting means. This problem is now eliminated advantageously in that an additional reinforcing means is provided besides the connecting means, which reinforcing means secures the thick core fiber at the input end via a longer section, so that movements of the thick core fiber can no longer be passed to the frontal face of the fiber.

Again, the length of the third subsegment is dictated by the diameter and material of the thick core fiber, and by the connecting means, and may also be determined in easily performed experiments.

If a connecting means is not provided at an interface with one of the optical components, but the thick core fibers extend directly from that optical component, of course the respective reinforcing means may be connected directly to that interface (for example rigidly coupled with the housing of the optical component in question).

The connecting means and the reinforcing means are preferably conformed as a single unit. For example, a new connecting means may be designed that already has the connecting means (e.g. wherein the plug may have a length corresponding to the necessary length for the second and/or third subsegment, and the thick core fibers may be secured over the entire length thereof within the plug). This advantageously leads to savings in manufacturing costs and simpler subsequent handling since only one component needs to be mounted on the device itself.

The guidance means is preferably conformed so that that subsegment of the thick core fiber is guided over an arc segment having an angle of curvature in the range between 45° and 90°. By itself, this conformation of the guidance means, which may be easily manufactured, allows the desired effects to be achieved. Of course all other possible conformations of the guidance means are conceivable provided the curvature is dimensioned accordingly.

The guidance means is preferably conformed so that the thick core fibers extend in a "w" formation inside the guidance means. The guidance means may also be conformed so that the thick core fibers extend inside the guidance means essentially in a formation corresponding to one and a half circles. This last formation is further particularly arranged so that the thick core fibers incorporate a reversal point in the one and a half circles in the region of the input and/or output. Also an arc segment having an angle of curvature in the range between 45° and 90° and the radius of curvature of which is also smaller than the first threshold value may be adjacent to the respective reversal point.

Alternatively, the guidance means is conformed such that the course of the thick core fibers through the guidance means includes at least one reversal point. As a consequence particularly of the multiple reversal points or the arrangement of the thick core fibers in accordance with the formations described above, the desired mode mixing for exciting a large number of guided modes is achieved in an advantageous manner. As was noted earlier, this results in the desired homogenization of the output beam profile.

The radius of curvature of the curved subsegments is preferably in the range between 100× and 30× the diameter of the thick core fiber. This radius of curvature in turn provides an upper threshold value for the most common thick core fibers, below which value the conditions for advantageous mode mixing and cladding suppression may be provided. The lower threshold value is derived from the breaking behavior of the thick core fiber. Then, the guidance means is preferably conformed such that the guided, curved length of the first subsegment of the thick core fiber is essentially between 10 cm and 100 cm.

The following measures may also be adopted to advantage:

from the group consisting of the various configurations of guidance means and reinforcing means, at least two means are rigidly connected together;

the rigidly coupled guidance means and/or reinforcing means are configured as a single component;

the diameter of the thick core fibers is selected to be larger than 500 micrometers;

the length of the thick core fibers between the two optical components is essentially in the range from 50 cm to 10 m, particularly in the range from 1 m to 3 m;

an additional (impact resistant) protective conduit is also provided, in which the thick core fiber extends through the remainder of the subsegment in an unsecured and flexible manner;

and/or the guidance means and/or the reinforcing means have the form of deep-drawn sheet metal and/or a milled unit.

The applicant reserves the right to pursue refinements to the object with respect to the reinforcing means also independently of the guidance means. According to the configurations described above, by its nature the reinforcing means contributes to a reduction in the modification of the measurement value as a consequence of changes in the position of the thick core fiber. Accordingly, anyone with average skill in the art may also select this reinforcing means purely as a compensation method if so desired, without the additional guidance means.

BRIEF DESCRIPTION OF THE DRAWINGS

Further advantages and features of the invention will be explained in the following using the example of preferred embodiments and with reference to the accompanying drawing. In the drawing.

DETAILED DESCRIPTION OF THE INVENTION

Figure 1:
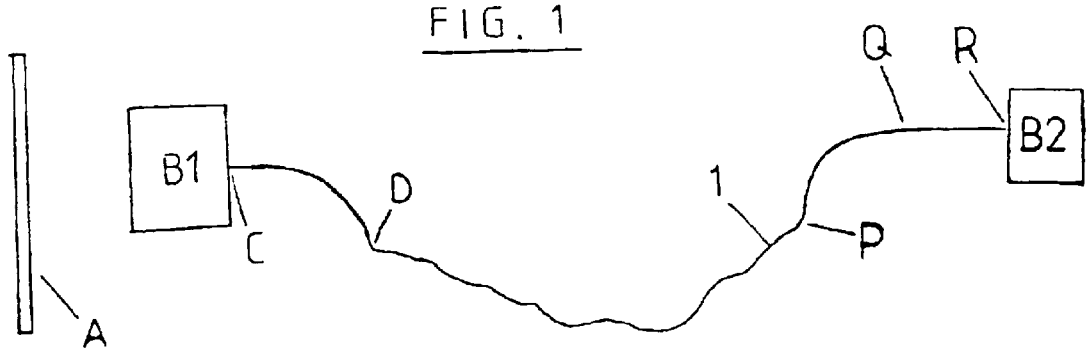
FIGS. 1 to 3 show diagrammatic representations of alternative configurations of the guidance means and a reinforcing means at subsegments of a thick core fiber.
Figure 2:
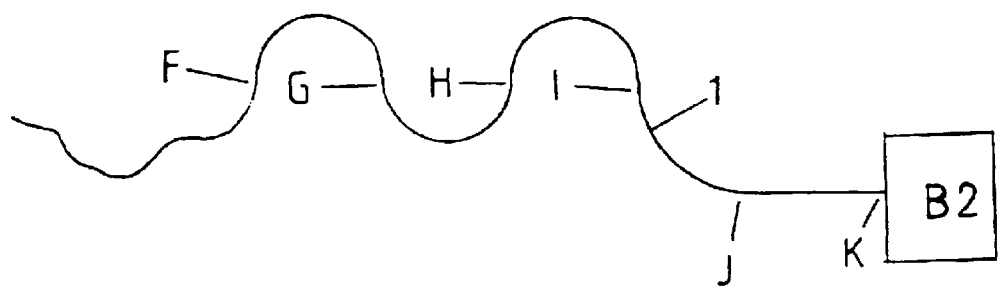
Figure 3:
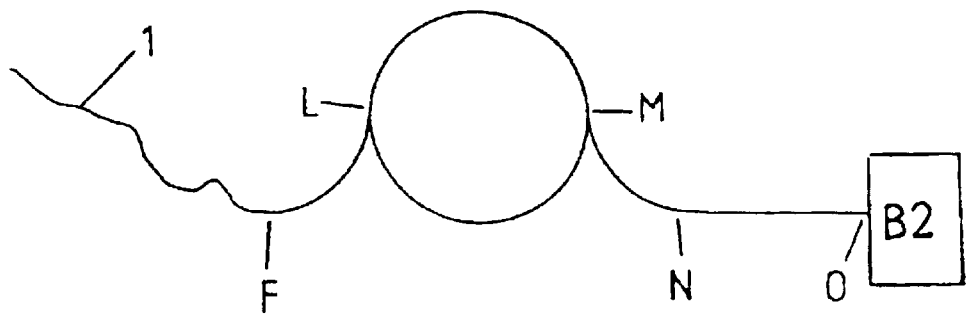

In FIGS. 1 to 3, reference character A designates an object for testing (for example a display to be tested) reference character B1 stands for a first optical component (for example an input optic B1), C to R are various subsegments of a thick core fiber 1, which are guided variously by the guidance means and reinforcing means, and B2 is a second optical component (for example an optical measuring instrument) of an optical measurement device.

The optical measurement device may be provided for example for spectroradiometry (calibrated analysis of light from radiation sources such as the sun, illuminants etc.), photometry (measurement of light radiation in the range visible to the human eye), spectroscopy etc., involving particularly the measurement of absolute luminosity values. In such measurements, changes in transmission or changes in the distribution of light at the fiber output end of the thick core fiber 1 transporting the light may provide a significantly false measurement reading. Such measurements are made for example as part of the quality inspection of LEDs, in which the optical properties of the LEDs (such as light intensity, radiation flux, dominant wavelength and chromaticity coordinate) are measured. Positionally separated measurements are required, for example, in quality control of manufactured displays, for which the luminance, chroma and brightness values have to be measured from various angles with respect to the display and for various regions of the display.

For testing the following light sources (object A), for example, the following input optics (optical component B1) are used and the following variables (radiometric or photometric units) are measured: tungsten halogen lamp—integrating sphere—radiant output or flux; LED—LED adapter—radiant intensity or luminous intensity; sun—external light probe—irradiance or illuminance; display—telescope head—radiance or luminance. A spectrometer, for example, may be used as the optical measuring device B2, in which case the total system (input optic, thick core fibers and spectrometer) must all be calibrated in the corresponding units.

FIG. 1 shows a first embodiment for attachment of a reinforcing means in combination with a guidance means according to a first configuration for rigid or curved guidance of subsegments of a thick core fiber 1 in fiber output region, and a reinforcing means for rigid guidance of a further subsegment of thick core fiber 1 in the fiber input region. The light from the object or process A to be measured is coupled into thick core fiber 1 via an input optic B1. For this purpose, immediately upon exiting input optic B1, thick core fiber 1 is rigidly guided by a reinforcing means (not shown in detail) from input optic B for a specific length between points C and D. This reinforcing means is used to secure the fiber end at the input side, so that movement of thick core fiber 1 does not cause canting of the fiber end at the input side. This reinforcement means may guide the fibers in any geometry as required, (preferably at a 45° angle or also in a straight line), its guidance length being selected so as to allow the fiber end to be secured as desired. Following this reinforcement means, thick core fiber 1 is guided for example unsecured in an impact-resistant guide conduit (between points D and P).

At output side R for an optical component B2, a guidance means according to a first configuration is provided for curved guidance of a subsegment of thick core fiber 1 between points P and Q, and is rigidly coupled with a reinforcing means for rigid guidance of a further subsegment of thick core fiber 1 between points Q and R (output side).

The reinforcing means may have a length of, for example several centimeters (e.g. 10 cm), the guidance means may describe an arc section having an angle of curvature between 45° and 90° (in the embodiment shown in FIG. 1, this angle of curvature is 90°), which in preferred radius of curvature corresponds to a value in the range between one hundred times and thirty times the diameter of a length of the fiber of up to 20 cm guided within the guidance means according to the first configuration. This first arrangement shown in FIG. 1 therefore features particular compactness. The total length of subsegments P and R and Q and R is selected so that thick core fiber 1 is secured (stabilized) at output end R against a change of position between points D and P, so that the cladding modes that are newly excited in curved subsegment PQ are always transmitted as far as fiber end R with constant intensity. Mode mixing takes place—as was done in the preceding—in curved subsegment PQ and the cladding modes excited prior to point P are suppressed. In addition, mode mixing assures a constant exit angle of the light from the thick core fiber, with the value for the digital aperture. Reinforcing means at output end R prevents further canting movements of the fiber frontal surface at the interface between thick core fiber 1 and output optic B1. Due to the rigid guide between P and R, the new cladding modes that are inevitably created in curved subsegment PQ are not influenced by movements of the fiber, so that their effect on the overall transmission of the fibers may be a constant and consequently—with appropriate calibration—calculable.

At this point it should be noted that the external contour of the guidance means of course does not necessarily have to reflect the required curved course for the thick core fiber.

For example, the guidance means may have an elongated rectilinear housing, the interior of which includes (perhaps punctiform) retaining points for securing the thick core fiber in such a manner that the thick core fiber assumes exactly the desired curved course inside the housing.

Alternatively, the reinforcing means and the guidance means according to the first configuration may be realized as a single unit. In addition, a connecting member (e.g. an SMA plug) may be provided at each of the interfaces between input and/or output optics B1 and B2 and thick core fiber 1 for detachable connection of input optic B1 and/or output optic B2 with thick core fiber 1. The combination of connecting member and reinforcing means will be described in detail later with reference to FIG. 4.

From point D to point F in proximity to an optical measurement device P—not shown in FIG. 1—the thick core fiber 1 is unsecured and flexible, or is guided in an impact-resistant guide conduit.

A guidance means according to the first configuration may be provided instead of the reinforcing means at the output side, also directly following the interface between thick core fiber 1 and output optic B2. This guidance means should be of such dimensions that it guides thick core fiber 1 in a curved course over a certain length, thereby ensuring that canting movements of the fiber frontal surface are effectively suppressed at the interface between output optic B2 and thick core fiber 1. Thick core fiber 1 is constrained and thus secured against the interior surface of this guidance means by the curvature itself. On the other hand, the radius of curvature of the curved guidance means of thick core fiber 1 should be correspondingly small within this guidance means (less than 10 cm for a thick core fiber having a core diameter of at least 500 micrometer), in order to achieve the desired effects described in the preceding. The configuration thus described corresponds to the case in which length of fiber guided by the reinforcing means tends towards zero, whereas the length of fiber that is guided rigidly and curved by the guidance means is long enough that the securing effect of the fiber output end is assured.

FIG. 2 shows a second embodiment of the arrangement of a reinforcing means and a guidance means according to a second configuration for curved, rigid guidance of at least a subsegment of a thick core fiber 1 in the fiber output area. The light is supplied to thick core fiber 1 by an optical component (e.g. the input optic B1 of FIG. 1 according to the course of thick core fiber 1 as illustrated in FIG. 1) not shown in FIG. 2. As far as point F, thick core fiber 1 may be guided, for example, unsecured and flexibly arranged inside an impact-resistant guide conduit—not further shown. Between points F and I, thick core fiber 1 is then guided rigidly inside the guidance means according to the second configuration, which is conformed so that thick core fiber 1 extends in a "w" formation within the second guidance means. Because of its "w" shaped formation, the thick core fiber within the second guidance means passes through a reversal point at least at points G and H (in FIG. 2 still at points F and I), at which points the desired mode mixtures for homogenizing the light beam profile are created particularly effectively. The radii of curvature of the rounded corners of the 'w' formation are preferably in the range between 100× and 30× the diameter of the thick core fiber, in order to achieve the three desired effects.

Between points I and J, thick core fiber 1 describes an arc segment of this guidance means having an angle of curvature of 90°, the radius of curvature of which is smaller than the first threshold value in order to achieve the desired effect. For rigid coupling of thick core fiber 1 with optical measuring instrument P, the fiber is guided between point J and interface K to optical measuring instrument B3 in a reinforcing means that is rigidly coupled with optical measuring instrument B2 and rigidly coupled with the first guidance means. Moreover, the total lengths of this reinforcing means and of the guidance means are again such that canting movements of the frontal surface of the fiber at the output end of thick core fiber 1 into measuring instrument P are suppressed.

FIG. 3 shows a third embodiment of an arrangement of reinforcing means and a guidance means according to a third configuration for guiding at least a subsegment of a thick core fiber 1 in curved manner at the fiber output end. As before, thick core fiber 1 is guided, for example, unsecured in an impact-resistant protective conduit as far as point F, between point F and point L it is rigidly guided in an arc segment having an angle of curvature of 90° of the guidance means according to the third configuration (radius of curvature smaller than the first threshold value), from point L to point M in a section of the guidance means in which the thick core fiber is rigidly guided around one and a half complete revolutions (radius of curvature smaller than the first threshold value), from point M to point N again in an arc segment having an angle of curvature of 90° of the guidance means according to the third configuration (radius of curvature smaller than the first threshold value) and from point N to an interface O with optical measuring instrument B2 inside a reinforcing means. In this way, the course of thick core fiber 1 incorporated reversals at points L and M.

The individual configurations of the guidance means and the reinforcing means may be produced in the form of deep-drawn sheet metal parts or as milled units.

Figure 4:
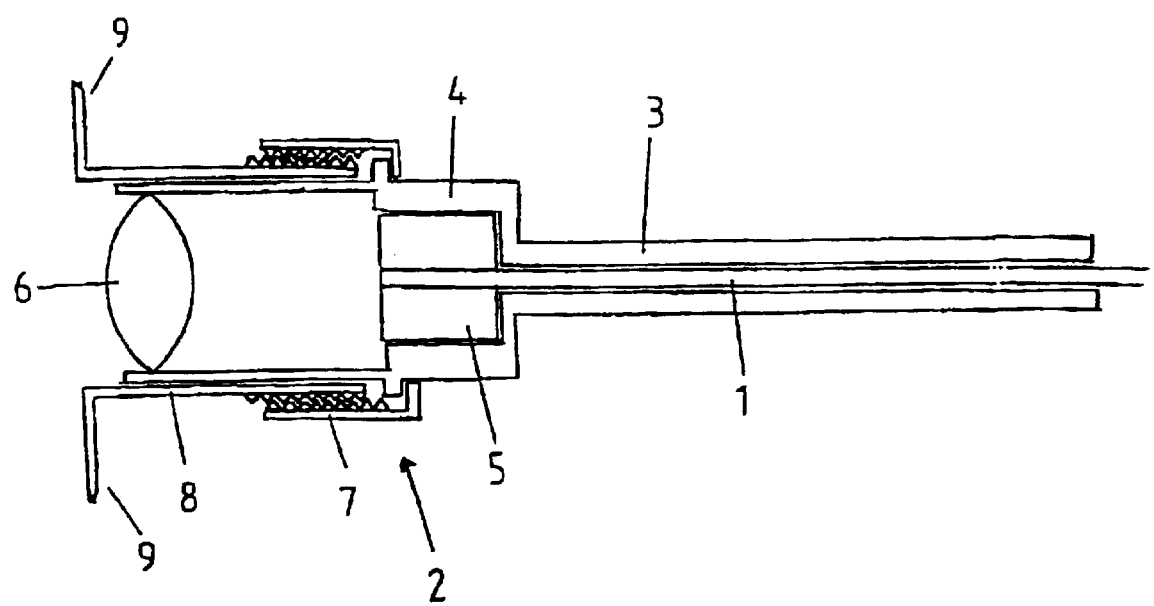
FIG. 4 shows a diagrammatic view of a connecting means that is coupled with a reinforcing means and the thick core fiber.

FIG. 4 is a diagrammatic view of a connecting member 2 that is coupled to reinforcing means 3 and thick core fiber 1. Connecting member 2 may be, for example, a commercially available SMA plug or similar, which is attached to one end of thick core fiber 1. A suitable plug has a plug housing 4, which supports the end of thick core fiber 1 with a fiber retaining element 5, and a lens 6, which serves to focus the light beam as it enters or exits thick core fiber 1. Plug 2 is secured by an internally threaded knurled ring 7 to an externally threaded connection point 8 on housing 9 of optic component B or P. Reinforcing means 3 is rigidly coupled with plug 2 at the point where thick core fiber 1 exits plug 2. In the embodiment shown in FIG. 4, reinforcing means 3 forms a single unit with plug 2, i.e. the two parts form an integral unit. Reinforcing means 3 is a rigid body having a lengthwise borehole, the diameter of which matches the external diameter of the thick core fiber so that the thick core fiber is trapped inside the longitudinal borehole. The length of reinforcing means 3 is such that rotating movements of the thick core fiber at the exit end of reinforcing means 3 are not translated into canting movements at the frontal surface of the fiber.

What is claimed is:

1. A device for transmitting light through an optical fiber (1) between optical components (B1, B2) of an optical arrangement provided at the input end (C) and the output end (R; K; O) of the optical fiber (1), and which includes a mode mixer having guidance means for curved, rigid guidance of at least a first subsegment (PQ; IJ; FGHI; FL; LM; MN) of the optical fiber (1), wherein the radius of curvature of the curved guide is less than a first threshold value, below which the light beam profile is homogenized by the optical fiber (1), characterized in that the guidance means is conformed in such manner that it guides an optical fiber (1) in the form of a thick core fiber and the device further includes a reinforcing means rigidly connected with the mode mixer for rigid guidance of a second subsegment (QR; JK; NO) of the thick core fiber (1), which is connected to the first subsegment (PQ FGHI; IJ; FL; LM; MN) and extends essentially as far as optical component (B2) at output end (R; K; O), wherein the reinforcing means is rigidly connected at the output end with the optical component (B2) during use in the optical arrangement and the overall length of the first and second subsegments together is at least such that the output end (R; K; O) of the thick core fiber (1) is mechanically stabilized.

2. The device according to claim 1, characterized in that the guidance means and/or the reinforcing means (3) are realized as deep-drawn sheet metal parts and/or a milled unit.

3. The device according to claim 1 characterized in that an additional reinforcing means that is rigidly connected a the input end to optical component (B1) during use in the optical arrangement is provided for rigid guidance of a third subsegment (CD) of thick core fiber (1), and which extends as far as optical component (B1) at the input end (C), wherein the length of the third subsegment (CD) is at least such that the input end (C) of thick core fiber (1) is stabilized.

4. The device according to claim 3, characterized in that the connection member (2) provided at output end (R; K; O), and/or input end (C) is rigidly coupled with the respective reinforcing means (3) as a single unit.

5. The device according to claim 3, characterized in that the connection member (2) and reinforcing means (3) are conformed as a single unit.

6. The device according to claim 1, characterized in that the guidance means is configured such that the subsegment (DE; IJ; FL; MN) of thick core fiber (1) extends along an arc segment having an angle of curvature in the range between 45° and 90°.

7. The device according to claim 1, characterized in that the guidance means is configured such that the subsegment (FGHI) of the thick core fiber (1) runs in a 'w' formation.

8. The device according to claim 1, characterized in that the guidance means is configured such that the course of subsegment (LM) of the thick core fiber (1) essentially completes one and a half complete revolutions.

9. The device according to claim 8, characterized further in that the guidance means is configured such that the course of the thick core fiber (1) incorporates a reversal point (L; M) in the one and a half complete revolutions in the region of input (L) and/or output (M).

10. The device according to claim 9, characterized in that the guidance means is configured such that the subsegment (FL; MN) of thick core fiber (1) immediately following reversal point (L; M) continues to follow the course of an arc section having an angle of curvature between 45° and 90°, the radius of curvature of which is also below the first threshold value.

11. The device according to claim 1, characterized in that the guidance means is configured such that the subsegment of the thick core fiber (1) incorporates a reversal point.

12. The device according to claim 1, characterized in that the first threshold value is essentially in the range between 100× and 30× the diameter of the thick core fiber.

13. The device according to claim 1, characterized in that the mode mixer and the reinforcing means (3) are conformed as a single unit at the output end.

14. The device according to claim 1, characterized in that the diameter of the thick core fiber (1) is greater than 500 micrometers.

15. The device according to claim 1, characterized in that the length of the thick core fiber (1) between the two optical components (B, P) is essentially in the range 50 cm to 10 m, particularly in the range from 1 m to 3 m.

16. The device according to claim 1, characterized further in that a protective conduit is provided, in which the thick core fiber (1) is guided unsecured for the remainder of the unsecured subsegment (DP).

17. The device according to claim 1, characterized in that a connection member (2) is provided at the interface (C, R, K, O) between the thick core fiber (1) and the optical component (B1, B2) at the input (C) and/or output end (R; K; O), for detachable connection of the thick core fiber (1) with the respective optical component (B1, B2).

18. The device according to claim 17, characterized in that the length of the first subsegment (PQ; IJ; EGHI; FL, LM, MN) is essentially in the range between 10 cm and 100 cm.

19. A device for transmitting light through an optical fiber (1) from an input end (C) to an output end (R; K; O) of optical fiber (1), which includes a mode mixer having a guidance means for curved, rigid guidance of a segment (PQ; IJ; FGHI; FL; LM; MN) of the optical fiber (1), wherein the radius of curvature of the curved guidance means is less than a first threshold value, below which the light beam profile is homogenized by the optical fiber (1) through mode mixing, characterized in that the guidance means is designed in such manner as to guide a thick core fiber as an optical fiber (1) and the mode mixer is rigidly connected at the output end with the optical component (B2) during use in the optical arrangement in such a manner that the output end (R; K; O) of the thick core fiber (1) is mechanically stabilized.

20. A method for transmitting light through an optical fiber (1) between optical components (B1, B2) of an optical arrangement provided at the input end (C) and an output end (R; K; O) of the optical fiber (1), according to which the light is transmitted through a rigidly guided, curved subsegment (PQ; FGHI; IJ; FL; LM; MN) of the optical fiber (1), wherein the radius of curvature of the first subsegment (PQ; FGHI; IJ; FL; LM; MN) is less than a first threshold value, below which the light beam profile is homogenized by the optical fiber (1) through mode mixing, characterized in that the optical fiber (1) is a thick core fiber and that the light is transmitted from the first subsegment (PQ FGHI; FL; LM; MN) essentially as far as the output end (R; K; O) of the optical fiber (1) through a second rigidly guided subsegment (QR; JK; NO) of the thick core fiber (1), wherein the second subsegment (QR; JK; NO) is rigidly connected at the output end with the optical component (B2) and the total length of the first and second subsegments is at least such that the output end (R; K, O) of the thick core fiber (1) is mechanically stabilized.

21. The method according to claim 20, characterized further in that the light is transmitted directly before the interface (C) of optical component (B1) at input end (C) through a third rigidly guided subsegment (CD; JK; NO) of the optical fiber (1), wherein the third subsegment (CD; JK; NO) is rigidly connected at the input end with optical component (B1) and the length of this third subsegment (CD) is at least such that the input end (C) of the thick core fiber (1) is stabilized.

22. The method according to claim 20, characterized in that the light is transmitted through a 'w'-shaped subsegment (FGHIJ) of the thick core fiber (1).

23. The method according to claim 20, characterized in that the light is transmitted through a subsegment (LM) of the thick core fiber (1) that describes one and a half revolutions.

24. A The method according to claim 20, characterized in that the light is transmitted through a subsegment (FLMN) of the thick core fiber (1), the course of which includes a reversal point (L; M).

* * * * *